United States Patent [19]
Pedinoff

[11] 4,016,563
[45] Apr. 5, 1977

[54] METHOD AND APPARATUS FOR ACOUSTO-OPTIC PULSE COMPRESSION

[75] Inventor: Melvin E. Pedinoff, Canoga Park, Calif.

[73] Assignee: Hughes Aircraft Company, Culver City, Calif.

[22] Filed: May 27, 1975

[21] Appl. No.: 581,398

[52] U.S. Cl. .......................... 343/5 SA; 324/77 K; 350/161 W
[51] Int. Cl.² ...................... G01S 9/00; G06G 7/19
[58] Field of Search ......... 324/77 K; 350/159, 152, 350/161; 332/7.51; 250/224, 225

[56] References Cited

UNITED STATES PATENTS

| | | | |
|---|---|---|---|
| 3,088,113 | 4/1963 | Rosenthal | 350/161 |
| 3,171,126 | 2/1965 | Wilry | 350/161 |
| 3,539,245 | 11/1970 | Brienza | 250/191 |
| 3,573,449 | 4/1971 | Maloney | 350/161 |
| 3,644,015 | 2/1972 | Hearn | 350/150 |
| 3,653,765 | 4/1972 | Hearn | 350/161 |
| 3,679,288 | 7/1972 | Harris | 332/7.51 |
| 3,740,117 | 6/1973 | Hubby | 350/152 |

*Primary Examiner*—Nelson Moskowitz
*Attorney, Agent, or Firm*—Donald C. Keaveney; W. H. MacAllister

[57] ABSTRACT

There is disclosed a pulse processing method and apparatus for compressing or changing the time scale of signal information represented by the modulation of a pulse of carrier energy which method and apparatus utilizes a crystal through which both a pulse of radio frequency acoustic energy and a pulse of polarized optical energy are simultaneously and colinearly transmitted to scatter energy in the optical pulse from one polarization state into the orthogonal polarization state. The crystal output is thus comprised of two optical pulses. One is the pulse having the original state of polarization and the other is the pulse resulting from the energy scattered to the orthogonal polarization state. The optical energy of rotated polarization is modulated in a fashion reproducing the modulation of the ultrasonic wave by which it is scattered. Furthermore, a short optical pulse can pass through the ultrasonic wave in a time short compared to the duration or length of the ultrasonic wave in the crystalline device. In so doing it reads the modulation of the acoustic pulse and transfers it to a time compressed pulse scale on the scattered optical output pulse. It is shown that the compression ratio is equal to the ratio of the velocity of light divided by the product of the velocity of sound in the crystal times the absolute value of birefringence of the crystal. If both the optical and acoustic pulses are passed through the crystal colinearly and in the same direction, the device takes a time function represented by the acoustic pulse, reverses it in time and compresses it by the ratio of light velocity to sound velocity thus producing a compressed inverse function. If the acoustic pulse and the light pulses are transmitted through the crystal colinearly but in opposite directions, the device takes a time function and without reversing it, compresses it in substantially the same ratio. The device may be applied, for example as a means of improving the signal-to-noise ratio, detection ratio and range resolution in radar systems or the like.

16 Claims, 11 Drawing Figures

METHOD AND APPARATUS FOR ACOUSTO-OPTIC PULSE COMPRESSION

RELATED APPLICATIONS

This application contains certain subject matter in common with my earlier filed patent application Ser. No. 558,761 filed by me on Mar. 17, 1975 now Pat. Ser. No. 398,671 and entitled "Method and Apparatus for Colinear Acousto-Optic RF Spectrum Analysis" which application, like the present application, is assigned to the Hughes Aircraft Company.

BACKGROUND OF THE INVENTION

Various filter and delay line devices have in the past been developed for use in such pulse processing applications as Pulse Compression Radar Systems which involve the transmission of a long coded pulse and the processing of the received echo to obtain a relatively narrow pulse. The increased detection capability of a long-pulse radar system is thus achieved while retaining the range-resolution capability of a narrow pulse system. Transmission of the long pulse permits a more efficient use of average power capability of the radar system and generation of high peak power signals is avoided. Additionally, the radar is less vulnerable to interfering signals that differ from the coded transmitted signal.

Systems utilizing this technique are described in detail in Chapter 20 of a book entitled, "Radar Handbook" published by the McGraw Hill Book Company in 1970 and edited by Merrill I. Skolnik of the U.S. Naval Research Laboratory. As pointed out therein, the pulse compression ratio is normally defined in the art as the ratio of width of the expanded pulse to that of the compressed pulse. The pulse-compression ratio is also equal to the product of the time duration and the spectral bandwidth (time-bandwidth product) of the transmitted signal. In passive systems a matched filter approach is used for the expansion and compression of the pulse. For example, filters may be used which are conjugates of each other for the expansion and compression. A filter is also matched to a signal if the signal is the time inverse of the filters's response to a unit pulse.

The best known and most widely used form of pulse compression in radar system is linear FM or "chirp". A linearly frequency modulated pulse is transmitted, producing a quadratic phase versus time history, and the received pulse is conventionally compressed by passing the signal through a dispersive delay line, usually after conversion to intermediate frequencies. The chirp waveform which is originally transmitted may be generated actively by sweeping an oscillator or passively by pulsing a dispersive delay line with a burst of carrier signal at intermediate frequencies. In the passive technique, the signal is usually but not necessarily compressed with the same dispersive network used to generate the waveform. Other usable coding includes phase coding and the even older forms of amplitude modulation such as transmisstion of a simple ramp signal.

On pages 20-35 and 20-36 of the Skolnik "Radar Handbook" there is described an optical correlator which uses optical techniques to provide matched filters for such pulse compression radar systems. The system shown in FIG. 31, thereof, for example, uses collimated monochromatic light applied orthogonally through a transparent ultrasonic light modulator. The received electrical signal at an IF frequency is applied to the transducer of the ULM where it is converted to an ultrasonic wave which propagates through the ULM and is absorbed at the opposite end. The collimated light incident upon the ULM becomes spacially modulated by the ultrasonic wave. A stationary reference mask consists of a grating pattern which corresponds to the coded signal waveform. Correlation occurs when the modulated signal caused by the received signal coincides with the pattern on the referenced mask. The compressed pulse is obtained at the output of a photodetector scanning the correlation mask. The minimum output pulse width is necessarily determined by this scanning time and by the transit time of the acoustic wave through the ULM orthogonally to the incident light pulse rather than by the duration of the light pulse. The general analytic theory of diffraction of light by ultrasonic waves intersecting the light waves orthogonally has been discussed at pages 593 through 610 of a book published in 1970 by the Pergamon Press entitled "Principles of Optics" by M. Born and E. Wolf. Neither of the above referenced books, however, discusses the phenomenon of colinear acousto-optical diffraction as distinguished from orthogonal acousto-optic diffraction.

However, in the heretofore unrelated art of optical filters, an acousto-optic tunable filter using colinear acousto-optic diffraction has recently been developed and reported by S. E. Harris and R. W. Wallace as described beginning at page 744 of Volume 59, No. 6 of the *Journal of The Optical Society of America* in June 1969. Further details were given by S. E. Harris and S. T. K. Nieh at pages 223-225 of Volume 17, No. 5 of "Applied Physics Letters", Sept. 1, 1970 and by the same authors together with D. K. Winslow pages 325 and 326 of Volume 15, No. 10 of "Applied Physics Letters", Nov. 15, 1969. This tunable filter employed a phenomenon originally described in detail by R. W. Dixon (IEEE, J. Quantum Electron, Q.E.-3 85, 1967). Dixon noted that in an appropriately oriented crystal, an incident optical beam of one polarization is deflected into the orthogonal polarization during its interaction with the colinearly propagating acoustic beam. In order for this phenomenon to occur, the active crystal medium must possess a non-zero element of the photo-elastic tensor appropriate to the interaction. The appropriate photo-elastic constant depends on such factors as crystal symmetry and whether a longitudinal or transverse acoustic wave is employed. Moreover, for the coupling to be effective along the whole interaction length, it is necessary that the optical and acoustic waves be appropriately phase matched. For a given acoustic frequency the phase matching condition is satisfied over a relatively narrow range of optical wavelength. Hence, only light in this wavelength range will be scattered from the original input polarization state to the polarization state orthogonal thereto.

Harris and Wallace proposed an electronically tunable optical filter using this phenomenon. Their basic idea was to utilize the linear acousto-optic diffraction in an optically anisotropic medium in such a fashion that by electronically changing the frequency of a pure C. W. sinusoidal driving acoustic wave, changes were produced in the band of optical frequencies that the filter passed. In their paper they give the specific details for a filter using a crystal of $LiNbO_3$. The Harris and Nieh paper described a filter using a crystal of CaMoO$_4$. Both papers note that when an acoustic wave travels in such a crystal, the strain induced change of the refractive index of the medium may diffract the light beam that is incident on the medium. In an isotropic medium, the polarization of the diffracted light is unchanged and the diffraction is particularly strong when the light is incident at the Bragg angle. In an anisotropic medium, for certain orientation, light may be diffracted from one polarization to another. In this case, the condition for interaction between the acoustic wave and the light wave is that the sum of the $k$ vectors of the incident light and the acoustic wave equal the $k$ vector of the orthogonally polarized diffracted wave. In their filter a crystal orientation is chosen such that an incident optical signal of one polarization is diffracted into the orthogonal polarization by a colinearly propagating acoustic beam. For a given acoustic frequency only a small range of optical frequencies will satisfy the $k$ vector matching condition and only this small range of frequencies will be cumulatively diffracted into the orthogonal polarization. If the acoustic frequency is changed, the band of optical frequencies which the filter will pass is changed.

In the Harris device the crystal is preceded by a polarizer through which light to be filtered is passed before entering the crystal and is followed by an analyzer having its polarization axis orthogonal to that of the polarizer so that only those frequency components of the beam which have been diffracted orthogonally in the crystal will pass through the analyzer. An electronically driven acoustic transducer supplies to the crystal a constant radio frequency signal of known preselected fixed single frequency to determine the passband of the filter with respect to an optical light beam of unknown mixed and/or variable frequency components. The basic phenomenon in the Harris device is utilized herein in a different manner and for a different purpose in other system combinations.

SUMMARY OF THE INVENTION

In it's basic form the present invention contemplates a source of modulated radio frequency electrical signal which is applied to an acoustic transducer to generate in an anisotropic acousto-optic diffracting crystal an acoustic wave which may travel in either of two opposite directions along the longitudinal axis of the crystal and which in turn is modulated to represent the modulation originally embodied in the radio frequency pulse both of which are in a first time scale. An optical pulse which is short in duration by comparison to the acoustic pulse is then propagated through the crystal either in the same or in the opposite direction as the acoustic pulse so as to interact with it in the crystal when the optical pulse overtakes and passes through the acoustic pulse. The optical pulse may be either monochromatic or white light depending upon the bandwidth of the intended application but is in any event passed through a polarizer before being transmitted through the crystal if it is not already polarized as is light from a laser source. The light output from the crystal is transmitted through an analyzer which has its polarization axis orthogonal to that of the polarizer and thence to a photodetector which converts the optical pulse to an electrical signal which is in turn transmitted to a processor and utilization circuit the details of which will vary depending upon a particular application.

The present invention teaches that a short optical pulse can pass through the ultrasonic wave in a time short compared to duration or length of the ultrasonic wave in the device. For example, in a four centimeter crystal the duration or transit time of a sound wave filling the crystal is $10 \times 10^{-6}$ seconds and the transit time of a light pulse is approximately $3 \times 10^{-10}$ seconds. Thus, a sub nanosecond pulse of light ($10^{-10}$ seconds) in scattering from the sound wave is stretched to $3 \times 10^{-10}$ seconds, but the acoustic signal information which is read onto it is compressed from $10 \times 10^{-6}$ to $3 \times 10^{-10}$ seconds. An optical pulse of duration $10^{-10}$ seconds undergoes an expansion ratio of three whereas the optical output signal represents a time compression ratio of the ultrasonic signal approximately equal to $3 \times 10^4$. Furthermore, the optical pulse now contains the information originally encoded on the ultrasonic wave or its time inverse depending upon the direction of interaction. This time compression occurs simply because the light signal travels faster than the sound wave. This effect also occurs if the light pulse has the same spatial extent as the sound wave. Specifically, if the light pulse has the same spatial modulation as the sound wave, auto or cross correlation occurs with time compression of the correlation function.

One intended application of the invention is to time compress RF signals using such ultrasonic waves and light waves. The invention can also be used to time expand ultrashort optical pulses such as those of picosecond duration. A system based on two such devices can be used to stretch an ultra-short optical pulse prior to amplification and transmission and for recompression of the expanded optical pulse on reception in an optical radar system. Similarly, in microwave radar systems the acousto-optical device of the present invention can be used to perform pulse compression for signals modulated in either width, amplitude, frequency, or phase as will be shown in greater detail below. Compression ratios are attainable in the present device which have magnitudes greater than those heretofore attainable.

BRIEF DESCRIPTION OF THE DRAWINGS

FIGS. 2a to 3c are waveform diagrams illustrating the operation of the device of FIG. 1.

DETAILED DESCRIPTION OF THE INVENTION

Figure 1:
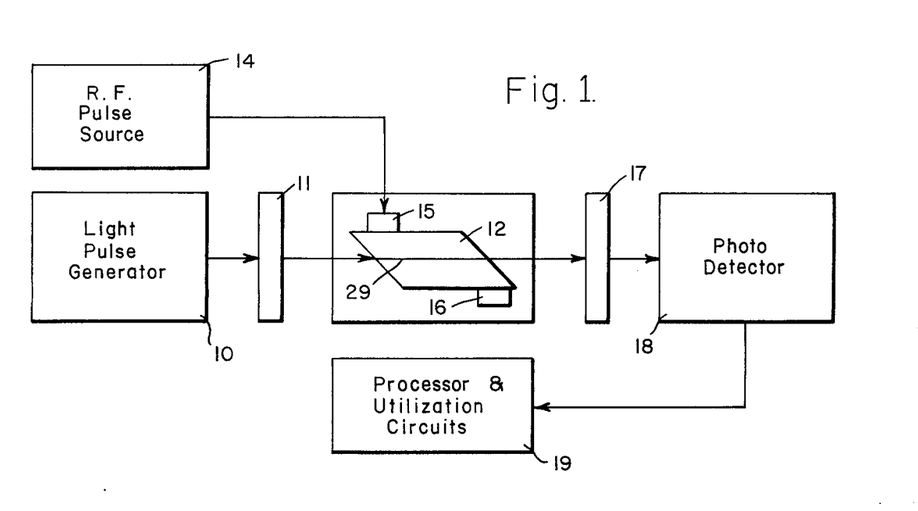
FIG. 1 is a block diagram of apparatus suitable for carrying out the method of this invention.

Turning now to the drawing there is shown in FIG. 1 the structural details of the basic device in accordance with the present invention. In FIG. 1 it will be seen that a light pulse generator 10 supplies one or a plurality of optical pulses through a polarizer 11 and thence into a crystal 12 which is the acousto-optic active medium. The crystal 12 is supported in any convenient manner in a transparent container of index matching fluid 13. A source 14 of modulated radio frequency pulses is connected to supply its output to an acoustic transducer 15 which is mounted on one end of the crystal 12. An acoustic absorber 16 is mounted on the other end. Both ends of crystal 12 are cut at a 45° angle to the longitudinal axis 17 of the crystal 12 and both ends of the crystal are preferably parallel to each other so that the cross-section of the crystal forms a parallelogram. The radio frequency signal generates a shear ultrasonic wave at the ultrasonic transducer 15 which wave reflects from the 45° face of the crystal for propagation along the crystal axis colinearly with the optical input pulse. A polarization analyzer 17 having its polarization axis orthogonal to that of polarizer 11 is positioned to receive the output from the longitudinal axis 17 of the crystal 12 and to transmit the output optical pulse to a photodetector 18 which converts it to an electrical pulse which is in turn supplied to the processor and utilization circuits 19. The desired output signal from the crystal 12 is a parametrically scattered light pulse whose polarization vector is rotated by 90° with respect to the input polarization. This desired pulse, and only this desired pulse, is transmitted by the analyzer 17 to photodetector 18.

The crystal 12 is preferably LiNbO$_3$ but may also be CaMoO$_4$, or LiIO$_3$ and functions as the acousto-optic element providing colinear interaction in the present invention. More generally, this crystal must be a birefringent material which has in its piezo-optic tensor $p_{ij}$, at least one non-vanishing term $p_{54}$, $p_{45}$, $p_{46}$, $p_{56}$, and for c-axis propagation in biaxial crystals $p_{65}$ or $p_{64}$. Of the crystals which satisfy this requirement those given above are the ones for which a measurement has been reported in the literature for one of the appropriate tensor elements and for an appropriate velocity. In the above referenced article in "Journal of the Optical Society of America" by Harris and Wallace, for example, it is reported that a crystal of LiNbO$_3$ is tunable from 4,000 A to 7,000 A by changing the acoustic frequency from 428 Mc/sec. to 990 Mc/sec. A graph of this experimentally observed relationship which may be used in the design of the systems discussed herein is shown in FIG. 6b. To do so, it is desirable to provide in the modulated RF pulse source 14, for example, suitable heterodyning means to change the frequency of any arbitrarily selected pulse which it is desired to process to a frequency falling within the response curve of the crystal as shown in FIG. 6b. Of course, if the pulse to be processed is frequency modulated, as is contemplated in the system of FIG. 5, the center frequency should fall essentially at the center of the calibration curve of FIG. 6 in order to permit a response along the range of the curve in a system using a white light pulse. Where the frequency of the RF pulse is a single known frequency, it is preferred to heterodyne that frequency down to a single selected point on the operating curve and to supply monochromatic light pulses of a frequency or wavelength corresponding to that point. The filter transmittance vs. normalized frequency as shown in the graph of FIG. 6a is thus utilized for noise rejection.

In general terms, the relationship between $f_0$, the optical frequency of the ordinary ray which is polarization diffracted, and $f_a$, the frequency of the acoustic wave is given by the expression $$f_o = \frac{c}{V_a} \frac{1}{|\Delta n|} f_a$$

where $c$ is the optical velocity in vacuum, $V_a$ is the acoustic velocity in the crystal medium and $\Delta n$ is the birefringence of the crystal. This relationship was reported in the article by Harris, Nieh and Winslow. For our present purposes it is more conveniently rewritten as $$f_a = \frac{V_a |\Delta n|}{\lambda_o}$$

where $\lambda_o$ is the optical wavelength of the diffracted ordinary ray. Of course it will be understood that the birefringence of the crystal, $\Delta n$, is equal to the difference between $n_o$, the ordinary index of refraction which is applicable to the state of polarization of the light in the optical input pulse, and $n_e$, the extraordinary index of refraction which is applicable to the state of polarization of the light in the pulse resulting from scattering in the crystal and which is desired output pulse. The velocity, V, of the ultrasonic wave of course refers to that velocity in the particular crystal.

Figure 2A:
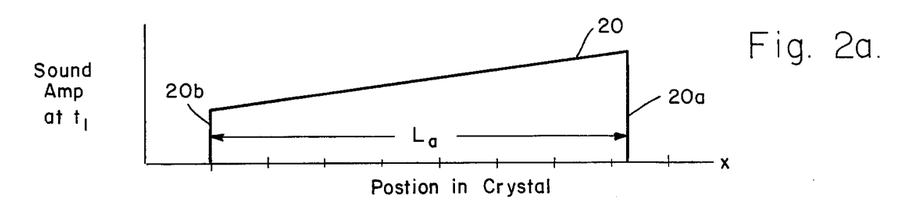
Figure 2B:
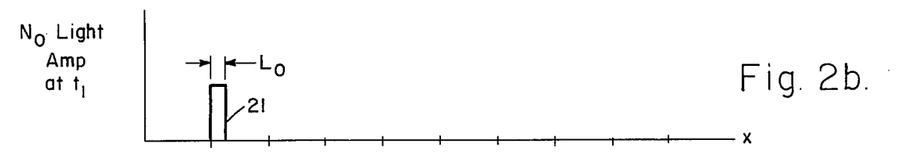
Figure 2C:
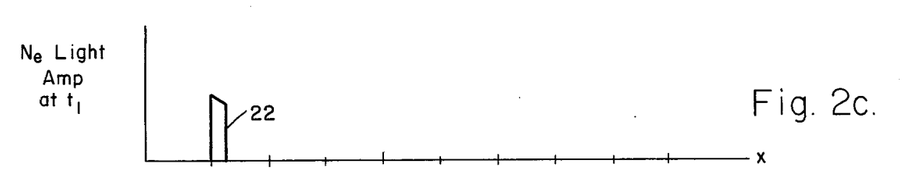

In FIG. 2a there is shown a graphical diagram of the sound amplitude of such an acoustic pulse as a function of position along the longitudinal axis 27 of crystal 12 at an arbitrarily selected initial time, $t_1$. FIGS. 2b and 2c are similar graphical representations taken at the same time, $t_1$, wherein FIG. 2b shows the amplitude of the input light pulse polarized along the ordinary axis having its index of refraction $n_o$ and FIG. 2c shows the amplitude distribution of the light pulse 22 scattered into the extraordinary polarization state having an index of refraction $n_e$ from the light pulse 21 of FIG. 2b by the interaction of pulse 21 with pulse 20. It will be noted that time $t_1$ is chosen to represent the instant at which the pulse 21 first fully overlaps with or coincides with the trailing edge of acoustic pulse 20 so that there can be complete interaction between these two pulses.

Figure 3A:
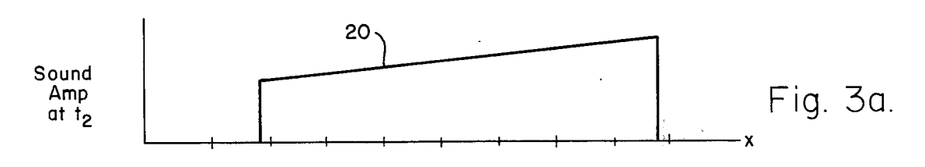
Figure 3B:
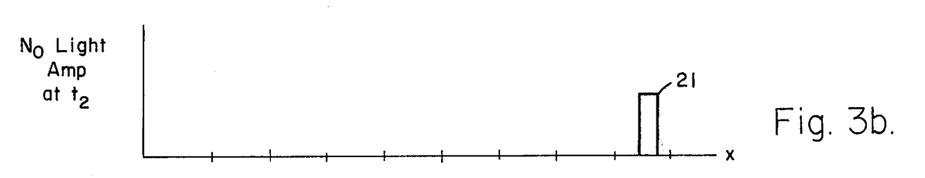
Figure 3C:
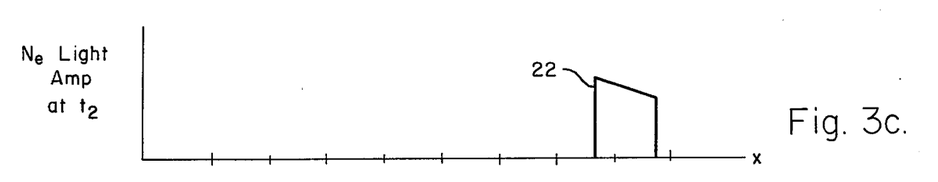

As has been pointed out above the velocity of the optical pulse 21 in crystal 12 is considerably greater than the velocity of the acoustic pulse 20. After a certain period of time, $\Delta t$, the pulse 20 will have progressed along the longitudinal axis of the crystal to the position shown for it in FIG. 3a. This is the position it occupies at the later time $t_2$, which is by definition taken to be equal to $t_1 + \Delta t$. In the interval of time $\Delta t$ between $t_1$ and $t_2$, the optical pulse 21 will have entirely passed to the other end of acoustic pulse 20 by virtue of the fact that it is moving at a much higher velocity than that of the acoustic pulse. This position of the pulse 21 at time $t_2$ is illustrated in FIG. 3b. In FIG. 3c there is shown the resulting scattered pulse 22' as it exists at time $t_2$ due to all the continuous scattering process which takes place as pulse 21 passes through and interacts with the full length of pulse 20.

It will of course be understood that the optical waves in pulses 21 and 22 respectively have different propagation velocities in the crystal due to the birefringence of the crystal 12. For example, let us consider that the acoustic pulse 20 has a duration of $T_a$ which on the scale of FIGS. 2 and 3 is approximately equal to $t_2-t_1$. The pulse 21 which is polarized along its ordinary polarization axis having an index of refraction, $n_o$, enters the region of crystal 12 occupied by the acoustic wave 20 and immediately begins to scatter light into the extraordinary polarization state having an index of refraction $n_e$ along that polarization axis which is orthogonal to the ordinary axis. The pulse resulting from this initial scattering at time $t_1$ is indicated as pulse 22. By virtue of the difference in value between the indices of refraction $n_e$ and $n_o$, however, the pulse 22 will transmit or propagate on through the crystal at a velocity different from the velocity of pulse 21 which is in the ordinary polarization state. Thus the contributions scattered by pulse 21 at initial time $t_1$ and those scattered at the exit time $t_2$ (as well as all intermediate contributions) are out of step and spread in proportion to the duration $T_a$ of the acoustic pulse which in turn is proportional to the acoustic pulse width $L_a$.

Consider, for example, as shown in greater detail in Appendix A, an acoustic pulse of duration $T_a = 10 \times 10^{-6}$ seconds propagating in LiNbO$_3$ and an optical pulse, such as pulse 21, of duration $T_0 = 10^{-12}$ seconds interacting with the acoustic pulse. The path length of the acoustic pulse is $$L_a = V_a T_a$$
$$= 6.57 \times 10^5 \text{ cm/sec} \times 10 \times 10^{-6}$$
$$= 6.6 \text{ cm}$$

The path length $L_o$ of the optical pulse 21 is $$L_o = \frac{c}{n_o} T_o = \frac{3 \times 10^{10}}{2.3} \times 10^{-12}$$
$$= 1.3 \times 10^{-2} \text{ cm}$$

where $c$ is the velocity of light in vacuum and $T_0$ is the duration of the input optical pulse 21.

As noted above, during the first instant of reaction the scattered pulse 22 has a duration and length which is simply equal to that of input pulse 21. However, due to the difference in the indices of refraction applicable to the two pulses during their transverse through the pulse 20, the output optical pulse 22' at the end of the acoustic pulse 20 has a duration $\Delta T$ given by the following expression $$\Delta T = T_o + (T' - T'') = T_o + \frac{L_a}{c}(n_o - n_e)$$

where $$T' = \frac{L_a}{v_o} = \frac{L_a n_o}{c}$$

$$T'' = \frac{L_a}{v_e} = \frac{L_a n_e}{c}$$

$n_o = 2.30; n_e = 2.21; (n_o - n_e) = 0.09$

Hence, $$\Delta T = 10^{-12} + \frac{6.6}{3 \times 10^{10}} \times 0.09$$

-continued $$= 19.8 \times 10^{-12}$$

It will thus be seen that the scattered output pulse 22' has a duration $\Delta T$ which consists essentially of two components, namely, the period of the original optical pulse width $T_0 = 10^{-12}$ plus the period attributable to the extended optical pulse width due to acoustic interaction which is approximately equal to $20 \times 10^{-12}$.

One can also write, $$\Delta T = T_o + \frac{V_a T_a}{c}(n_o - n_e)$$

which, to within 5 percent is approximately $$\frac{V_a T_a}{c}(n_o - n_e).$$

Hence the signal pulse compression ratio R is given by $$R = \frac{T_a}{\Delta T} = T_a \times \frac{c}{V_a T_a (n_o - n_e)}$$

$$= \frac{c}{V_a} \times \frac{1}{|\Delta n|}$$

$$= \frac{3 \times 10^{10}}{6.6 \times 10^5 \times 0.09} = 5 \times 10^5$$

It is thus seen that the pulse compression ratio R is directly proportional to the ratio of the velocity of light, $c$, to the velocity of sound, $V_a$, and inversely proportional to the birefringence $\Delta n$. Hence, if the birefringence is too small, very little optical pulse spreading is obtained and impossibly short optical input pulse durations are required.

Restating the effect, the scattered optical waves will move either faster or slower than the incident waves due to the birefringence of the crystal and depending upon whether the birefringence is positive or negative. This leads to an output optical pulse of light scattered to the extraordinary polarization state and having a width proportional to the acoustic pulse width provided the optical pulse width is sufficiently narrow. Whether the birefringence is positive or negative, or whether the incident polarization is ordinary or extraordinary, is of no consequence in the ultimate utilization of the output pulse.

It is thus obvious that, where one is talking about pulse width modulation, the operation as described so far can be used to compress radio frequency acoustic pulses or it can be used to expand short duration optical pulses. Also, however, if the acoustic wave is amplitude modulated, this modulation will be transferred onto the optical pulse producing very high frequency optical pulse modulation not obtainable by other means.

Let us consider, for example, the acoustic pulse 20 having a ramp modulation of linearly increasing amplitude as shown in FIG. 2a. More particularly, let us consider what happens as this acoustic pulse 20 is traversed by the optical input pulse 21 which interacts with it in the crystal. The interaction phenomenon can only occur when acoustic energy and optical energy are both present in the same place at the same time. Furthermore, if the optic pulse is much shorter in time than the acoustic pulse (as is the case) so that the region occupied by the pulse is a small fraction of that occupied by the acoustic pulse, then interaction can only occur sequentially as the optic pulse passes through each sequential segment of the entire region energized by the acoustic pulse.

It is shown in the mathematical discussion given in Appendices B and C at the end of this specification that where sufficient acoustic and light power are used in a crystal of appropriate length the output light power is equal to a function of the input acoustic power times the square of the path length, L, which is the length of the path common to both the acoustic and optic waves interacting in the crystal rather than the path for either wave alone. Also, for small amplitudes, the optical power with polarization X lying along the ordinary axis $n_o$ scattered out of the incident beam with polarization Z lying along the extraordinary axis $n_e$ is proportional to the incident optical power $P_z(O)$ and to the incident acoustic power $P_a$. The interaction is also proportional to the square of the interaction length, that is, to $L^2$. For the case where the optical pulse is physically shorter than the ultrasonic acoustic pulse in the medium, the value of L will be equal to the length of the optical pulse and is fixed rather than variable.

In consequence the optical signal can be written in the form $$P_x = P_z P_a \text{ times a constant} \quad (8)$$

wherein $P_x$ equals the output at polarization X along the extraordinary axis having $n_e$ and $P_z$ is the input having polarization Z lying along the ordinary axis having $n_o$, and $P_a$ is the acoustic input power.

If these powers $P_x$, $P_z$, and $P_a$ represent time function modulations such that $$P_A = f(t) = \text{acoustic signal}$$

$$P_z = g(t) = \text{optical input signal}$$

$$P_x = h(t) = \text{optical output signal}$$

and if these functions propagate with respective velocities V for the acoustic signal, $C_o = c/n_o$ for the input signal, and $c_e = c/n_e$ for the output signal, then the time varying output of the device has the form $$h(t) = \int_{-\infty}^{\infty} f\left(t' - \frac{c_e t}{V}\right) g\left(t' - \frac{c_e t}{c_o}\right) dt'$$

For the case where $g(t)$ is a unit impulse or delta function such as shown at pulse 21 FIG. 2d, this becomes upon integration and evaluation $$h(t) = f\left(\left[\frac{c_e}{c_o} - \frac{c_e}{V}\right] t\right)$$

but the input contribution $c_e/c_o$ is approximately equal to one whereas the output contribution $c_e/V$ is approximately equal to $0.25 \times 10^5$. Hence we may write $$h(t) = f\left(-\frac{c_e}{V} t\right)$$

More generally we may note that signals which are propagating through the crystal medium as travelling waves take the form $f(t-X/V)$ or $g(t-X/c_o)$. Here the function $f(t)$ is taken as the acoustic pulse and the function $g(t)$ is taken as an optical unit impulse moving with velocity $c_o = c/n_o$. Since the interaction of the sound and light waves in the crystal occurs only in region occupied by both waves and is proportional to the amplitudes of both waves, the output is given by $$h(x) = c \int_T f\left(t - \frac{x}{V}\right) g\left(t - \frac{x}{c_o}\right) dt$$

$$= f\left(\frac{x}{c_o} - \frac{x}{V}\right)$$

Integration over time yields the spatial distribution of the scattered light with extraordinary polarization. The amplitude at each spatial point is given by $$h(x)\delta\left(t - \frac{x}{c_e}\right)$$

Integration over space yields the output signal as $$h(t) = c \int_x h(x)\delta\left(t - \frac{x}{c_e}\right) dx$$

$$= c \int_x f\left(\frac{x}{c_o} - \frac{x}{V}\right) \delta\left(t - \frac{x}{c_e}\right) dx$$

$$\cong c f\left(-\frac{c_e}{V} t\right)$$

This indicates that device takes a time function $f(t)$ and reverses it and compresses it by the ratio of the value of the velocity of light and the value of the velocity of sound.

As can be noted from the above equations and from the waveform 22' in FIG. 3c, and as is more rigorously shown in the Appendices, the device takes a time function and reverses it and compresses it by the ratio of light velocity to sound velocity while preserving modulation. The time reversal arises from the fact that the light input pulse 21 as it is overtaking the modulated acoustic pulse 20 encounters the trailing edge 20b of pulse 20 before it encounters the leading edge 20a of pulse 20. This time reversal phenomenon can of course be eliminated by interacting the acoustic pulse with the light pulse along the same colinear axis but moving in opposite directions rather than moving in the same direction as taught by Harris and as has been shown in FIGS. 2 and 3. Thus it will be noticed that in FIG. 1 the acoustic transducer 15 is positioned at the light input end of crystal 17 whereas in FIGS. 4 and 5 the acoustic transducer is positioned at the light output end of the crystal in order that the acoustic pulse and the input pulse may move in opposite colinear directions in order to eliminate the time reversal phenomenon.

Figure 4:
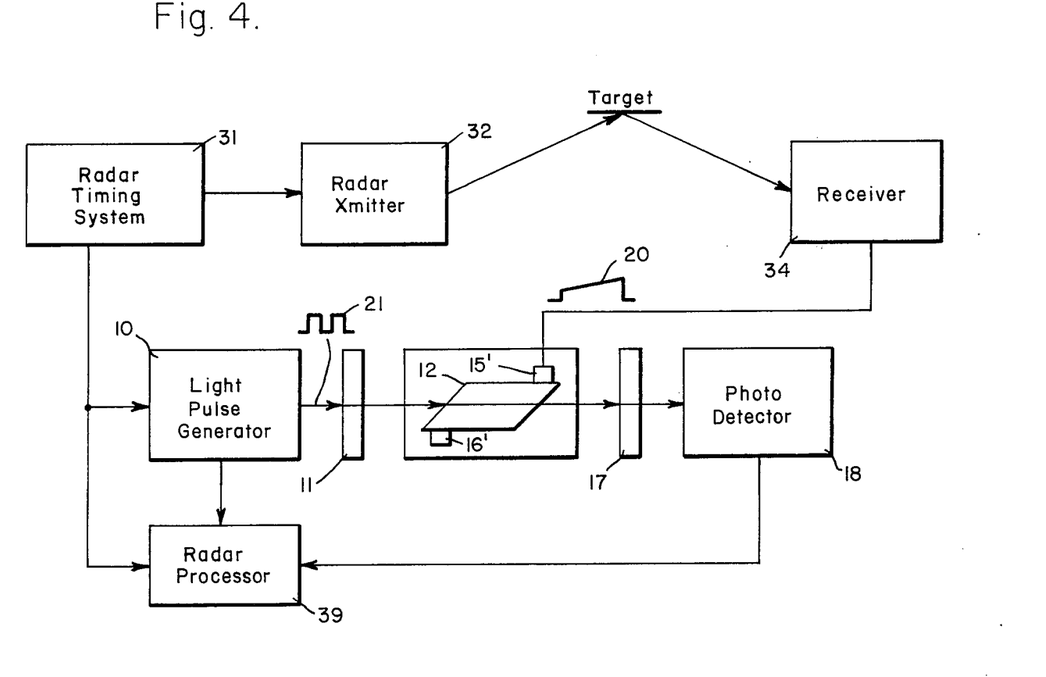
FIG. 4 is a block diagram showing the manner in which the device of FIG. 1 may be used in a radar system having an amplitude modulated pulse.

In FIG. 4 there is shown one typical application of the method and apparatus as discussed in detail above. In FIG. 4 the timing system 31 of the radar equipment is shown controlling the radar transmitter 32 which transmits a pulse having ramp amplitude modulation imposed on a fixed frequency carrier to a target from which the pulse and all other pulses following it in the train of transmissions is reflected to a receiver 34. The receiver 34 heterodynes the received pulse to a suitable intermediate frequency within the response range of the crystal 12 which is positioned between polarizer 11 and analyzer 17 in the same manner as discussed in connection with FIG. 1. The light pulse generator 10 is operated also under the control of the radar timing system 31 and generates a series of monochromatic light pulses having a frequency or wavelength selected to interact with the acoustic wave frequency in the crystal 12 which is generated by the acoustic transducer 15'. It will be noted that transducer 15' is shown positioned at the light output end of the crystal 12 in order to avoid time reversal as dicussed above. The scattered compressed pulse transmitted from crystal 12 is passed through polarizer 17 to a photodetector 18 which converts the compressed light pulse to a corresponding electrical pulse which is supplied to the radar processor 39. Radar processor 39 is also operated responsively to signals from the timing system 31 and receives as another input light pulses generated in generator 10 directly therefrom in order to provide a reference for time and distance calculations. Not only does the use of the acousto-optical signal compressor including cystal 12 provide the usual improvement in increasing the signal to noise ratio available in the radar processor which generally results from time compression techniques, but also its inherent filter action provides additional noise rejection. Furthermore, there is a considerable improvement by way of reduction of the false alarm ratio and by way of increase in the range resolution which is attainable.

For example, the subnanosecond pulses 21 which are generated by the light pulse generator 10 may be spaced apart by any convenient time interval which is substantially less than the one microsecond which may reasonably be assumed for a typical duration of pulse 20. Pulses 21 may be spaced 100 nanoseconds apart so that a large number of the pulses will interact with the pulse 20 while it is passing through the crystal 12. Of course, any one of these pulses is sufficient to detect the pulse 20 and to compress its modulation individually in a minimum reliability sense or case. However, the use of a plurality of pulses 21 provides a redundancy and an increase in reliability and resolution through use of appropriate logic circuitry in the radar processor which will be obvious to those skilled in the art. In the simplest example, merely counting the number of pulses 21 which are permitted to pass through the analyzer 17 by the gating action of pulse 20 while pulse 20 is passing through the crystal 12 gives a direct counting measure of the width of pulse 20 which can be used together with the amplitude modulation of each to verify detection of a true radar pulse rather than a false alarm return.

Figure 5:
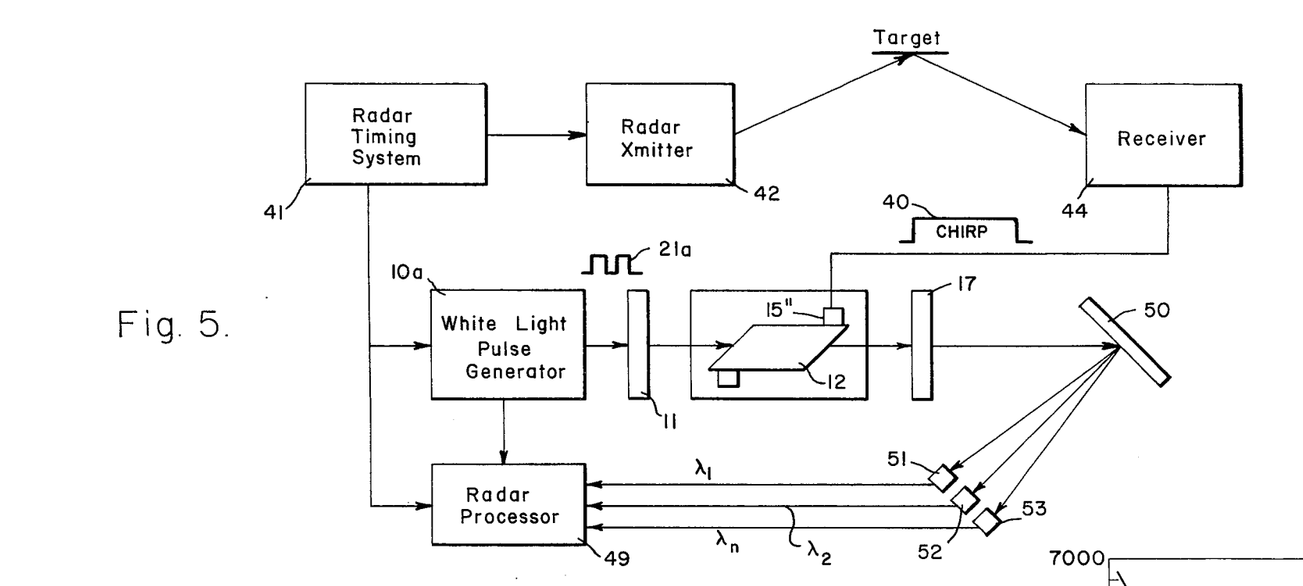
FIG. 5 is a block diagram similar to FIG. 4 but showing the manner in which the device of FIG. 1 may be modified for use in a radar system using a frequency modulated pulse.
Figure 6A:
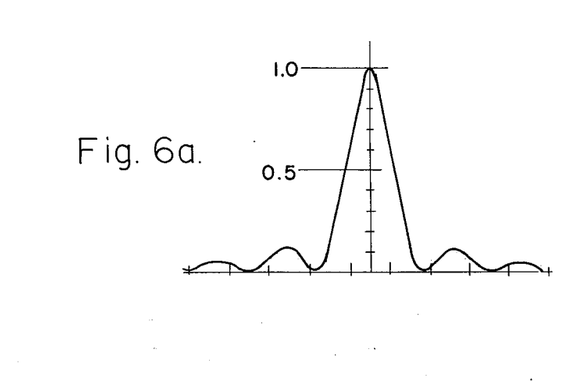
FIG. 6a is a graph showing the filter transmittance as a function of normalized frequency deviation from any established center frequency of the crystal regarded as a filter as reported by Harris and Wallace at page 746 of the June 1969 issue of the "Journal of the Optical Society of America" Volume 59, No. 6.
Figure 6B:
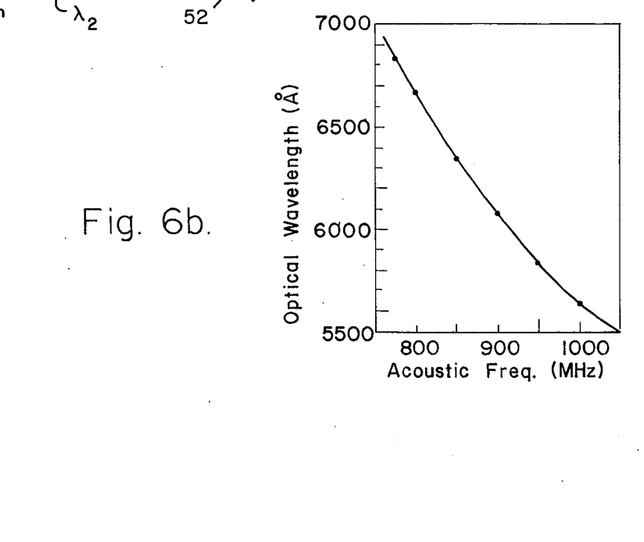
FIG. 6b is a graph showing the relationship between the optical center wavelength of the ordinary ray in the light beam which is scattered and the corresponding acoustic frequency which causes the scattering of that ray for the crystal used in the device of FIG. 1.

In the exemplary system shown in FIG. 5 a radar timing system 41 controls a radar transmitter 42 which transmits what is commonly referred to as "chirp" pulses to a target from which it is reflected to receiver 44. The "chirp" pulse is a pulse which has been frequency modulated to have a linearly increasing frequency as a function of time during the duration of the pulse and is a well known form of coding for pulse compression. The timing system 41 also controls a white light pulse generator 10a and a radar processor 49. Pulse generator 10a is identical to generator 10 except that its output is a series of pulses 21a of white light having a full spectrum of optical wavelength or frequencies rather than a series of pulses of monochromatic light. The polarizer 11 polarizes these white light pulses for transmission through crystal 12 and analyzer 17 in the manner discussed above. The "chirp" pulse 40 at an appropriately selected intermediate frequency determined by the heterodyning circuits in receiver 44 is applied to the acoustic transducer 15'' for transmission through crystal 12 colinearly with but in opposite directions to the optical input pulses 21a. The output pulses from analyzer 17 are reflected by a reflection grating 50 through angles the magnitude of which depend upon the frequency of the component of the pulses striking the grating. A plurality of photodetectors 51, 52 and 53, for example, may be dispersed in angularly spaced relationship to the reflection axis from gating 50 so that each receives a predetermined band of frequencies thus dividing the frequency spectrum into channels of bandwidths depending upon the physical dimensional width of the detector.

Except for the fact that this system is operating on a pulse rather than a continuous wave basis and is using a photodetector array rather than a screen for display purposes, the operation of the crystal 12 and grating 50 shown in FIG. 5 embodies the same principles as have been disclosed in my above noted copending application, Ser. No. 558,761, PD-73305 entitled "Method and Apparatus for Colinear Acousto-Optic RF Spectrum Analysis". In effect, this system is performing a series of high speed repetitive quantized or digitized frequency spectrum analyses on the "chirp" pulse being received to electronically read out its frequency components. Of course, it will be realized that any suitable number of detectors may be used in the detector array 51, 52, 53 depending primarily upon the design of the initial frequency composition of the transmitted "chirp" pulse and the requirements of the radar processor 49 to which the output from each of the detectors 51, 52 and 53 are supplied. The duration of the scattered pulse reflected from grating 50 to each detector now depends not only on the considerations discussed above, but also on the fact that scattering of a given wavelength in the crystal occurs only during that portion of the acoustic wave during which its frequency is at the operative scattering frequency indicated by FIG. 6b as a center frequency to within the limits shown by the transmittance bandwidth of FIG. 6a.

Again the advantages enumerated above of improved signal to noise ratio, lower false alarm rate or higher detectability, and improved range resolution are attainable by providing suitable logic and processing circuitry in the radar processor 49 in accordance with techniques well known in the art.

APPENDIX A

CALCULATION OF THE TIME COMPRESSION EFFECT IN AN ANISOTROPIC COLINEAR ACOUSTO-OPTIC INTERACTION

The dimension occupied by the ultrasonic wave of duration $T_a$, and velocity $V_a$ in a specific crystal is given by $$L_a = V_a T_a \quad \text{Eq. A1}$$

For a 10 $\mu$sec pulse in LiNbO$_3$ $$L_a = (6.57 \times 10^3 \text{ cm/sec}) \times 10 \times 10^{-6} \text{ sec} = 6.6 \text{ cm}$$

Similarly, the dimension occupied by a light pulse of duration $T_o$ and velocity $c/n_o$ is given by $$L_o = \frac{c}{n_o} T_o \quad \text{Eq. A2}$$

For a $10^{-12}$ sec pulse in LiNbO$_3$ $$L_o = \frac{3 \times 10^{10}}{2.3} \times 10^{-12} = 1.3 \times 10^{-2} \text{ cm}$$

This specific pair of pulses has a duration ratio of 500:1.

The time required for the leading edge of the optical pulse to propagate through the ultrasonic pulse is approximately given by $$T' = \frac{L_a}{n_o} = \frac{L_a n_o}{c} \quad \text{Eq. A3}$$

where $n_o$ is the ordinary index of refraction and $c$ is the free space velocity of light. (If the velocity of light were equal for both polarizations, the scattered light would propagate concomitantly; however, no compression would be allowed.) The light of orthogonal polarization scattered from the leading edge of the optical pulse at the start of the ultrasonic pulse propagates through the ultrasonic pulse in a time $$T'' = \frac{L_a}{n_e} = \frac{L_a c}{n_e} \quad \text{Eq. A4}$$

where $n_e$ is the extraordinary index of refraction. Therefore, the leading edge of the optical pulse has just stopped scattering light at $T'$ but earlier scattered light will arrive at $T''$. Note $T'$ may be larger or smaller than $T''$, depending on the relative magnitude of $n_o$ and $n_e$. The difference in propagation time $T'-T''$ is the optical pulse stretching time and the pulse width $T_o$ must be added to this difference to obtain the total scattered optical pulse width, i.e., $$\Delta T = T_o + |T' - T''|$$

$$= T_o + \frac{L_a}{c} |n_o - n_e| \quad \text{Eq. A5}$$

In this example $n_o = 2.30$ $n_e = 2.21$ $(n_o - n_e) = 0.09$. Hence from Eq. A5

$$\Delta T = 10^{-12} + \frac{6.6}{3 \times 10^{10}} \times 0.09 = 20.8 \times 10^{-12}$$

Thus the optical pulse is stretched by a factor of 20, and the acoustic wave duration is compressed by a factor of $5 \times 10^5$.

This is easily seen by recasting equation A5 in the form $$\Delta T = T_o + \frac{V_a T_a}{c} |n_o - n_e| \quad \text{Eq. A6}$$

and defining the pulse compression ratio R as $$R = \frac{T_a}{\Delta T} \cong \frac{c}{V_a} \times \frac{1}{\Delta n} \quad \text{Eq. A7}$$

one obtains $5 \times 10^5$ for R.

A more general theoretical treatment of this effect which does not neglect the motion of the sound wave while the optical pulse passes through it is given in Appendix C.

APPENDIX B

AN ANALYSIS OF THE FUNCTIONAL DEPENDENCE OF SCATTERED OPTICAL OUTPUT POWER TO INPUT OPTICAL AND ACOUSTIC POWERS IN THE ACOUSTO-OPTIC DEVICE

It can be shown from the theory of the device reported by Harris et al., JOSA 59, 746 (1969), that:

1. The phenomenon of colinear acousto-optic interaction only occurs when acoustic energy and optic energy is in the same place at the same time.

2. If the optic pulse is much shorter in time than the acoustic pulse so that the region occupied by optic pulse is a fraction of that occupied by the acoustic pulse, then interaction can only occur sequentially as the optic pulse passes through the region energized by the acoustic pulse. This is simply a statement that two forms of energy must exist at the same point at the same time in order to interact.

The angular wavelength transfer factor as shown on pages 745 and 746 of the Harris article, JOSA 59 (1969), has the form $$\frac{P_z(L)}{P_z(O)} = \frac{\omega_o}{\omega_e} \Gamma^2 L^2 \frac{\sin^2\left(\Gamma^2 L^2 + \frac{\Delta k^2 L^2}{4}\right)^{1/2}}{\Gamma^2 L^2 + \frac{\Delta k^2 L^2}{4}} \quad \text{Eq. B1}$$

For the case of collimated optical and acoustic energy beams, $\Delta k = 0$ and the expression reduces to $$\frac{P_z(L)}{P_z(O)} = \sin^2 \Gamma L \quad \text{Eq. B2}$$

with the approximation $\omega_o/\omega_e = 1$.

The acousto-optic term, $\Gamma$, is defined by $$\Gamma^2 = \frac{n_o^3 n_e^3 P_{45}^2 \pi^2}{2V_a^3 \lambda_o^2} \left(\frac{P_A}{A}\right) \qquad \text{Eq. B3}$$

where $P_A/A$ is the acoustic power density, $n_o$ and $n_e$ are the ordinary and extraordinary indices of refraction, $P_{45}$ is the acousto-optic tensor involved, P is the density of the crystal medium, $V_a$ is the acoustic velocity and $\mu_o$ is the optical wavelength. $P_X(L)$ is the optical power scattered out of the sound wave after interacting over a distance L. and $P_z(O)$ is the orthogonally polarized optical input power at the entrance face of the crystal. The equation can be rewritten in the form $$P_x(L) = P_z(1) \sin^2\left(\sqrt{\frac{n_o^3 n_e^3 P_{45}^2 \pi^2}{2PV_a^3 \lambda_o^2 A} \frac{P_A}{A}} \cdot L\right) \qquad \text{Eq. B4}$$

For small values of $\Gamma L$ one can write $$\underbrace{P_x(L)}_{\substack{\text{output}\\\text{light}\\\text{power}}} = \underbrace{P_z(1)}_{\substack{\text{input}\\\text{light}\\\text{power}}} \frac{n_o^3 n_e^3 P_{45}^2 \pi^2 \overbrace{P_A}^{\substack{\text{input}\\\text{acoustic}\\\text{power}}}}{2PV_a^3 \lambda_o^2 A} L^2 \qquad \text{Eq. B5}$$

Therefore, for small amplitudes the output power with polarization $x$ scattered out of incident beam with polarization $z$ is proportional to incident optical power $P_Z(O)$ and incident acoustic power $P_A$. The interaction is also proportional to the square of the interaction length ($L^2$). For the case where the optical pulse is physically shorter than the ultrasonic pulse in the medium, the L will be the optical pulse dimension and is fixed.

In consequence, the scattered optical signal at a specific point in space and time can be written in the form $$P_x = P_z P_A \times \text{constant} \qquad \text{Eq. B6}$$

$P_x$ = output at polarization $e$,
$P_z$ = input at polarization $o$, and
$P_A$ = acoustic input.
If these powers $P_x$, $P_z$, $P_A$ represent time modulation e.g.,

| $P_A = f(t)$ | (acoustic signal) |
| $P_z = g(t)$ | (optical input signal) |
| $P_x = h(t)$ | (optical output signal) | and these functions propagate with velocities $V_a$, $c_o = c/n_o$, and $c_e = c/n_e$ where $n_o$ and $n_e$ are the ordinary and extraordinary indices of refraction, then it can be shown that the time-varying output of the device has the form of an integral over time of the product of these functions. This is a consequence of the contributions to the output being additive with time. Thus the output optical signal $h(t)$ is related to the input acoustic and optical signals $f(t)$ and $g(t)$ by the equation $$h(t) = \int_{-\infty}^{\infty} f\left(t' - \frac{c_e t}{V_a}\right) g\left(t' - \frac{c_e t}{c_o}\right) dt' \qquad \text{Eq. B7}$$

This derivation is treated more generally in Appendix C. For the case where $g(t) = \delta(t)$ $$h(t) = f\left(\left[\frac{c_e}{c_o} - \frac{c_e}{V_a}\right] t\right) \qquad \text{Eq. B8}$$

Since $c_e/c_o \approx 1$ and $c_e/c_o \ll c_e/V_a$, this can be written in the form $$h(t) = f\left(-\frac{c_e}{V_a} t\right) \qquad \text{Eq. B9}$$

Since $c_e/V_a \approx \frac{1}{4} \times 10^5$, the time function $f(t)$ has been compressed by a factor of $2.5 \times 10^4$, and time-reversed because the light wave propagates faster than the sound wave.

APPENDIX C
TIME COMPRESSION AND TIME REVERSAL OF ACOUSTIC SIGNALS VIA COLINEAR ANISOTROPIC SCATTERING OF LIGHT

In the work of Harris et al., the interacting waves are designated as follows: $P_A$ = acoustic signal, $P_z$ = optical input signal, $P_x$ = optical output signal. We have shown in Appendix B that an approximately linear dependence between these variables exists of the form, $$P_x^\alpha P_a P_z \qquad \text{Eq. C1}$$

under the condition that $P_A$ times a length parameter is less than some specific value. In the following treatment we make the following substitutions:

| $P_A = f(t)$ | acoustic input |
| $P_z = g(t)$ | optical input |
| $P_x = h(t)$ | optical output | with the provision that $h(t)$ is related to the product of the integral of the quantities $f(t)$ and $g(t)$ over space and time including the traveling wave description of these functions, i.e., since $f(t)$ represents a traveling sound wave of velocity $V_a$ the function is written $$f\left(t - \frac{x}{V_a}\right).$$

Similarly $g(t)$ has the form $$g\left(t - \frac{x}{c_o}\right)$$

where $c_o$ is the optical propagation velocity.

Consider input r.f. signal $f(t)$ transduced in the form of a sound wave represented by $f(t - x/V_a)$ propagating through the acoustic medium with a velocity $V_a$. At any point $t_i x_i$ a light pulse, represented by $\delta(t - x/c_o)$ where $\delta(t)$ is the Kroniker delta function and $c_o$ is the velocity of light for the ordinary polarization, passes through the sound pulse and scatters out an orthogonal polarization component which is also a $\delta$ function but which travels with velocity $c_e$ where $c_e$ is the extraordinary velocity of light. Because the input delta function and the output delta function travel at different velocities, integrations over time and space must be performed to obtain the true time dependence of the associated waveforms.

1. The interaction of the sound wave and the light pulse is given as an integral over time of the product of the sound and light time functions and yields the space dependence of the scattered light wave.

$$H(x) = \int_{-\infty}^{\infty} f\left(t - \frac{x}{V_a}\right) g\left(t - \frac{x}{c_o}\right) dt \qquad \text{Eq. C2}$$

but the light pulse is represented by $g(t) = \delta(t)$. Therefore $$H(x) = \int_{-\infty}^{\infty} f\left(t - \frac{x}{V_a}\right) \delta\left(t - \frac{x}{c_o}\right) dt \qquad \text{Eq. C3}$$

and $$H(x) = f\left(\frac{x}{c_o} - \frac{x}{V_a}\right) \qquad \text{Eq. C4}$$

This is a spatial weighting factor which launches waves of extraordinary polarization.

2. The total scattered optical signal is obtained by integrating a continuum of delta functions weighted by the spatial weighting factor $h(x)$ over the propagation path. In this case, the resultant wave integral has the form $$H(t) = \int_{-\infty}^{\infty} H(x) \delta\left(t - \frac{x}{c_e}\right) dx \qquad \text{Eq. C5}$$

$$H(t) = \int_{-\infty}^{\infty} f\left(\frac{x}{c_o} - \frac{x}{V_a}\right) \delta\left(t - \frac{x}{c_e}\right) dx \qquad \text{Eq. C6}$$

$$= f\left[\left(\frac{c_e}{c_o} - \frac{c_e}{V_a}\right) t\right]$$

Since $c_e V_a \gg c_e/c_o$, one can write for the output optical signal $$H(t) \approx f\left(-\frac{c_e}{V_a}\right) t \qquad \text{Eq. C7}$$

Then to a very good approximation the acoustical signal input modulation appears time-reversed and time-compressed as an optical modulation waveform where an optical delta function input pulse is scattered from the sound wave.

3. If the sound wave and light wave travel in opposite directions, the output optical signal is not time-reversed and it is easy to see that it will be of the form $$H(t) = f\left[\left(\frac{c_e}{c_o} + \frac{c_e}{V_a}\right) t\right] \approx f\left(\frac{c_e}{V_a}\right) t \qquad \text{Eq. C8}$$

Again, the signal is time compressed by the ratio $c_e/V_a$.

4. In the general case where the light wave pulse is not a delta function but is finite in duration and described by $g(t)$, the wave integrals take the form $$H(x) = \int_{-\infty}^{\infty} f\left(t - \frac{x}{V_a}\right) g\left(t \mp \frac{x}{c_o}\right) dt \qquad \text{Eq. C9}$$

$$H(t) = \int_{-\infty}^{\infty} H(x) \delta\left(t \mp \frac{x}{c_e}\right) dx \qquad \text{Eq. C10}$$

(Note either both + or both − signs are used.)

The limitations or constraints on these signals follow:

a. The length of the time-varying signal $f(t)$ must not exceed the time delay of the crystal.

b. The optical pulse $g(t)$ must be short compared to the signal $f(t)$ for significant pulse compression to occur.

c. The optical pulse must propagate through the crystal when the entire time signal $f(t)$ is stored in the medium.

d. The optical pulse may propagate in the same direction or opposite to that of the sound wave [$f(t)$]. The minus sign describes the first case and the plus sign describes the case of opposite propagation.

e. The process may start with either polarization so that $c_e$ and $c_o$ may be interchanged in the equations.

5. The general equations can be applied to signal excursion, signal compression or both for specific applications. For example, this signal processing technique can also be used to expand a short optical pulse for transmission to a target and then for recompression of the optical pulse after reception or reflection from the target. The general equations for this case are severely complicated but a specific example can be described.

If a delta function light pulse with velocity $c_o$ interacts with the sound wave, $f(t)$ we have shown earlier that the transmitted, scattered light pulse propagates with velocity $c_e$ and has the form $$H(t) = f\left[\left(\frac{c_e}{c_o} \mp \frac{c_e}{V_a}\right)t\right] \approx f\left(\mp \frac{c_e}{V_a}\right)t \quad \text{Eq. C11}$$

Using the general equations $$H(x) = \int_{-\infty}^{\infty} f\left(t' - \frac{x}{V_a}\right) g\left(t \mp \frac{x}{c_o}\right) dt' \quad \text{Eq. C12}$$

$$H(t) = \int_{-\infty}^{\infty} H(x) \, \delta\left(t \mp \frac{x}{c_e}\right) dx \quad \text{Eq. C13}$$

and combining these euqations, one finds $$H(t) = \int_{-\infty}^{\infty} f\left(t' \mp \frac{c_e}{V_a}\right) t \, g\left(t' - \frac{c_e}{c_o} t\right) dt' \quad \text{Eq. C14}$$

Using the derived relationship $$H(t) = f\left(\left[\frac{c_e}{c_o} \mp \frac{c_e}{V_a}\right] t\right) \quad \text{Eq. C15}$$

which describes the output light pulse which may be transmitted to a target, and after reflection and reception passed through the acousto-optic device in the reverse direction we find the scattered optical output obtained by substituting H(t) in place of $g(t)$ now is of the form $$H'(t) = \int_{-\infty}^{\infty} f\left(t' - \frac{c_e}{V_a} t\right) f\left[\left(\frac{c_e}{c_o} \mp \frac{c_e}{V_a}\right)\left(t' - \frac{c_o}{c_e} t\right)\right] dt' \quad \text{Eq. C16}$$

where the roles of $c_o$ and $c_e$ are reversed here because the entrance polarizations are interchanged. This expression reduces to approximately $$H'(t) \cong \int_{-\infty}^{\infty} f(\tau - Rt) f(\mp R\tau \pm Rt) d\tau \quad \text{Eq. C17}$$

with $\tau = t'$ $$R = \frac{c_o}{V_a} \cong \frac{c_e}{V_a} \approx 10^5 \quad \text{Eq. C18}$$

when $$\left[\frac{c_o}{c_e} \text{ or } \frac{c_e}{c_o}\right] \ll \left[\frac{c_o}{V_a} \text{ or } \frac{c_e}{V_a}\right]$$

Equation C17 has interesting behavior since the factor $Rt$ represents time compression of the signals of $10^5$ and the factor $-R\tau$ produces time compression of the convolved or correlated output signal. The plus or minus sign is determined from the relative directions of propagation of the light and sound waves and produces either a convolution or a correlation-like effect. Specifically, if $f(t)$ is a rectangular pulse of width T, then $f(\tau - Rt)$ is a rectangular pulse of width T/R and $H'(t)$ is a triangular pulse of width 2T/R2. In the general case where $f(t)$ is non-sinusoidal (fm chirp, etc.), the compression can be much greater. In that case the detailed quantitative analysis is feasible only via computer calculation.

What I claim is:
1. A method of changing the time scale of signal information represented by the modulation of a pulse of carrier energy, said method comprising the steps of:
   a. transmitting a pulse of acoustic energy modulated to represent said information in a first time scale through an optically anisotropic medium capable of producing colinear acousto-optic diffraction;
   b. transmitting a pulse of optical energy of a first predetermined polarization state through said medium colinearly with said pulse of acoustic energy while said acoustic pulse is in said medium to interact therewith in said medium to diffract said light pulse from said first polarization state to a second polarization state during the time interval of said interaction;
   c. detecting only the light pulse emitted from said medium in said second polarization state to detect said signal information in a second time scale; and
   d. controlling the relationship between the time duration of said pulse of acoustic energy and the time duration of said pulse of optical energy of said first predetermined polarization state to produce a predetermined relationship between said first and second time scales of said signal information as a function of said controlled relationship between said time durations of said pulses and of the relationship between the respective velocities of said acoustic and optical pulses.
2. A method as in claim 1 wherein said pulse of acoustic energy and said pulse of optic energy are transmitted through said medium colinearly and in the same direction to produce an output pulse the modulation of which is an inverse time function of the modulation of said pulse of acoustic energy.
3. A method as in claim 1 wherein said pulse of acoustic energy and said pulse of optical energy are transmitted through said medium colinearly but in opposite direction to produce an output pulse the modulation of which is a direct time function of the modulation of said pulse of acoustic energy.
4. A method as in claim 1 wherein said time duration of said pulse of optical energy is short by comparison to said time duration of said pulse of acoustic energy in order to compress said first time scale of the modulation of said pulse of acoustic energy to a shortened time scale represented by the modulation of said light pulse emitted from said medium in said second polarization state.
5. A method as in claim 4 wherein said pulse of carrier energy is received by a radar equipment.
6. A method as in claim 3 wherein said time duraction of said pulse of optical energy is short by comparison to said time duration of said pulse of acoustic energy in order to compress said first time scale of the modulation of said pulse of acoustic energy to a shortened time scale represented by the modulation of said light pulse emitted from said medium in said second polarization state.

7. A method as in claim 1 wherein said pulse of acoustic energy has a fixed frequency and said pulse of optical energy is monochromatic at a wavelength which is diffracted in said crystal by acoustic energy at said fixed frequency.

8. A method as in claim 1 wherein said pulse of acoustic energy is frequency modulated and said pulse of optical energy comprises wideband white light.

9. The method of analyzing the frequency spectrum of a radio frequency signal pulse comprising the steps of:
   a. deriving from said radio frequency signal pulse an acoustic pulse having frequency components representative of the frequency components of said radio frequency signal pulse;
   b. simultaneously transmitting said acoustic pulse and a pulse of polarized wideband white light colinearly through an optically anisotropic crystal to produce acousto-optic diffraction of the plane of polarization of those frequency components of said light pulse which bear a predetermined relationship to the frequency components present in said acoustic pulse;
   c. passing said polarization diffracted light pulse from said crystal through a polarization analyzer to transmit only those frequency components which have been polarization diffracted;
   d. dispersing the light output pulse of said polarization analyzer by deflecting each of the frequency components thereof by an amount which is proportional to the frequency of said component; said,
   e. detecting each of said dispersed components to produce a plurality of pulses representative of an analysis of the frequency spectrum of said radio frequency pulse signal, each of said output pulses being representative of a predetermined frequency bandwidth in said frequency spectrum of said signal pulse.

10. A method as in claim 9 wherein said radio frequency signal pulse is a frequency modulated pulse received by a radar equipment.

11. Acousto-optic pulse processing apparatus comprising:
   a. a source of signal representing energy pulses;
   b. optically anisotropic crystal means for producing acousto-optic polarization diffraction of a light pulse by an acoustic pulse passing through said crystal means colinearly with said light pulse while at least a portion of said acoustic pulse and said light pulse simultaneously occupy the same linear position in said crystal;
   c. transducer means for deriving said acoustic pulse from said signal representing energy pulse source and for applying said acoustic pulse to said crystal means to represent the information on said signal pulse by said acoustic pulse;
   d. light pulse source means for supplying at least one pulse of light having a predetermined axis of polarization as an input to said crystal means to interact with said acoustic pulse along said colinear position therein;
   e. a polarization analyzer having its polarization axis orthogonal to said predetermined axis of polarization and positioned to receive the light output from said crystal means and to transmit the polarization diffracted light pulse; and
   f. means for detecting said transmitted light output pulse and for supplying a signal representative of said detected pulse to a utilization circuit.

12. Apparatus as in claim 11 wherein:
   a. said source of signal representing energy pulses is the radar receiver of a radar equipment,
   b. said utilization circuit to which a signal representative of said detected pulse is supplied is the processor of said radar equipment; and,
   c. said light pulse source means is a light pulse generator, both said light pulse generator and said radar processor being controlled by the radar timing system of said radar equipment.

13. Apparatus as in claim 12 wherein the radar transmitter of said radar equipment transmits a series of pulses the carrier frequency of each of which is constant during each entire pulse and wherein said light pulse generator output is a series of monochromatic light pulses each of which has a duration which is short by comparison to the duration of each of said radar pulses.

14. Apparatus as in claim 13 wherein each of said series of radar pulses is amplitude modulated.

15. Apparatus as in claim 13 wherein said transmitted series of radar pulses is duration width coded and wherein said processor includes means for counting said light pulses as a measure of said received radar pulse width.

16. Apparatus as in claim 12 wherein said radar transmitter transmits a series of pulses the frequency of each of which is modulated during each pulse and wherein said light pulse generator output is a series of white light pulses each of which has a duration which is short by comparison to the duration of said radar pulses, said apparatus further including diffraction grating means for receiving the output of said polarization analyzer and for diffracting each component of said output by an angle which is a function of the frequency of said component, and a plurality of detectors each of which is positioned to receive a predetermined one of said frequency components, the output of each of said detectors being supplied to said processor of said radar equipment.

* * * * *